Nov. 20, 1923.  1,474,673
M. G. HUSTED
ATTACHMENT FOR LATHES
Filed March 28, 1922   2 Sheets-Sheet 1
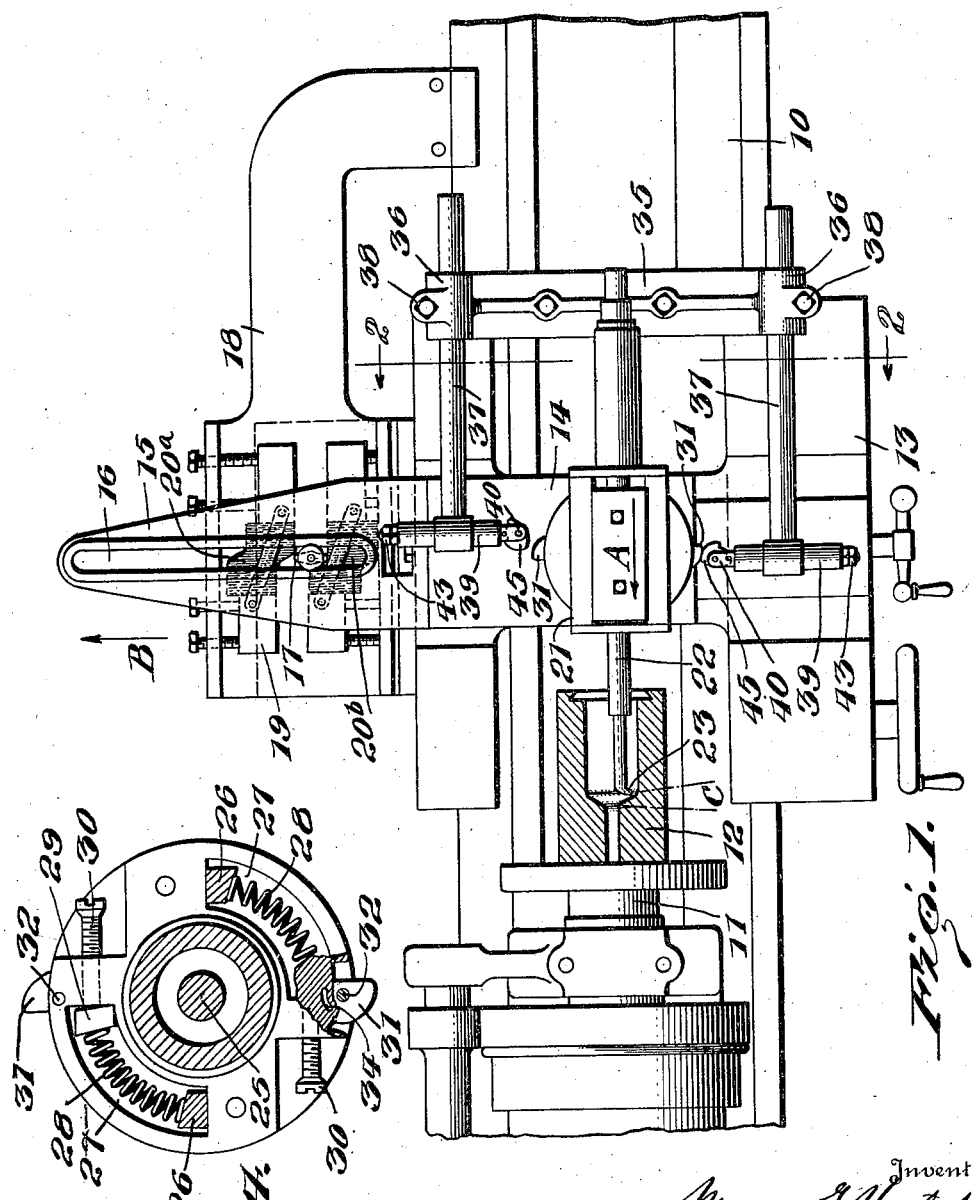

Nov. 20, 1923.
M. G. HUSTED
ATTACHMENT FOR LATHES
Filed March 28, 1922
1,474,673
2 Sheets-Sheet 2
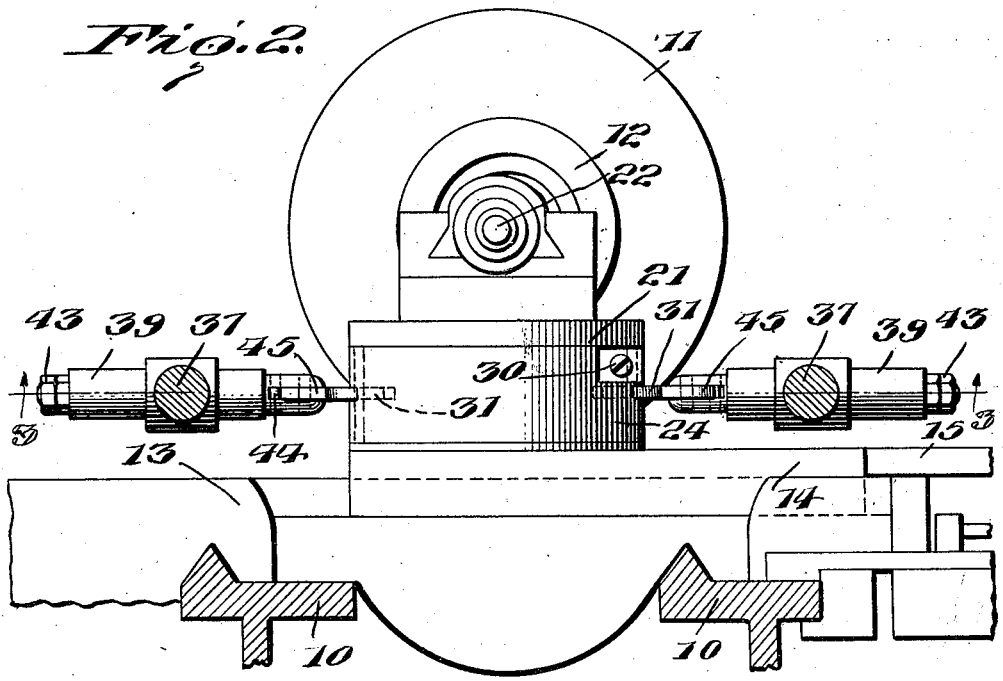
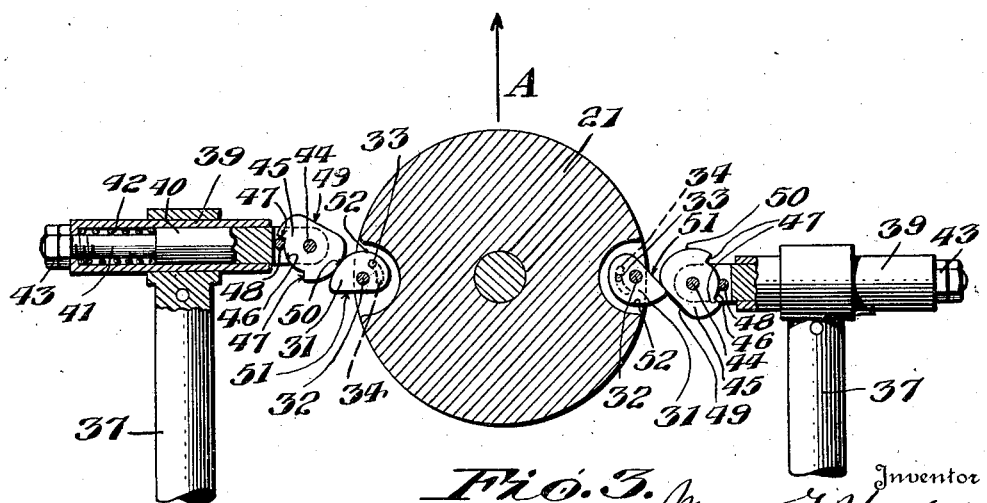

Patented Nov. 20, 1923.

1,474,673

UNITED STATES PATENT OFFICE.

MONROE G. HUSTED, OF BRIDGETON, NEW JERSEY.

ATTACHMENT FOR LATHES.

Application filed March 28, 1922. Serial No. 547,487.

*To all whom it may concern:*

Be it known that I, MONROE G. HUSTED, a citizen of the United States, and a resident of Bridgeton, in the county of Cumberland and State of New Jersey, have invented certain new and useful Improvements in an Attachment for Lathes, of which the following is a specification.

My invention relates to an attachment for lathes and more particularly to a control device for the cutting tool and carrier. I have illustrated the invention as used in connection with the type of lathe employing a rotary work carrier and a movable tool carrier in which the tool is moved toward and from the work during the cutting operation. The type of lathe illustrated herein is particularly adapted for forming moulds but it should be understood that my invention is equally applicable to other types of lathes as will be made more apparent hereinafter.

Generally speaking this invention contemplates means for use in connection with a tool carrier which is guided by a cam groove, the cam groove functioning to displace the tool carrier transversely causing the same to properly fashion the work piece. In this present instance where the work piece is a mould for bottles, the function of the cam groove is to move the tool carrier so as to cause the same to properly shape the mould at the point which represents the point where the neck of the bottle merges into the body thereof.

Despite the fact that cam groove controls have been heretofore found to be the most efficient manner of guiding the cutting tool, difficulty has been experienced in causing the tool to properly cut the work piece when the face or the part to be cut was abrupt. This was due largely to the fact that the bearing surface of the guide roller travelling in the cam groove was struck on a different radius than the cutting face of the cutting tool, thereby rendering impossible a synchronizing of the movement of the guide roller and the cutting edge of the tool.

I have found therefore that in order to efficiently and correctly guide the cutting tool at the point of the work piece representing the neck of the bottle, the guide roller or guide member working in the cam groove, must at this part of its travel, clear the confining edges of the cam groove and bear against relatively opposed edges of the cam groove at this point at least, during its travel therethrough. That is, in one direction the guiding member must be caused to bear against the edge of the cam groove over which it may more easily slide and on its return movement to be moved to slide on the opposed edge of the cam groove.

For accomplishing this, I have provided two pair of cam members provided with associated springs whereby an engagement of a pair of said cam members will cause a shifting of the tool carrier and a consequential engagement of the guiding member with one of the other faces of the cam groove.

One constructional example of my invention is illustrated herein so as to enable those skilled in this particular art to appreciate its advantages.

In the drawings:

Fig. 1 is a top plan view of a portion of the lathe constructed in accordance with my invention, Fig. 2 is an enlarged fragmentary transverse section taken on the plane indicated by line 2—2 in Fig. 1, Fig. 3 is a horizontal section taken on the plane indicated by line 3—3 of Fig. 2, certain parts being in elevation, and, Fig. 4 is a detail horizontal section of the tool carrier.

In the drawings, the numeral 10 indicates the bed of a lathe and 11 a rotatable work holder, which may be rotated by any suitable source of power (not shown). Supported on the work holder is a work piece 12 which is here shown as a bottle mould, the work to be accomplished being that of fashioning the interior of the work piece.

A travelling carriage 13 is positioned upon the lathe bed and adapted to travel longitudinally thereof to reciprocate the cutting tool. Mounted on the carriage 13 and adapted to move transversely thereof is a cross slide 14. Rigidly secured to one end of the cross slide 14 is an arm 15 formed with a slot 16 therein. This slotted arm 15 is adapted to adjustably support a guiding member 17, here shown as comprising an elongated tapered body. Rigidly secured to the bed of the lathe is a support 18 which carries the adjustable cam groove 19. This cam groove member or templet is composed of two pair of rigid guide members and two sections 20ª and 20ᵇ formed of a plurality of leaves whereby the guide groove at this point may be adjusted according to the shape of the work piece to be fashioned. It should be noted that while the guiding member 17 is movable through the greater part of the cam groove without any appreciable amount of play that, at the portion of the groove formed by the leaved sectors 20ª and 20ᵇ a slight clearance is provided, this clearance being in most instances about one-sixteenth of an inch.

Mounted upon the cross slide 14 is a resilient tool carrier 21 which supports a cutting tool 22 provided with a cutting edge 23. As more fully described in my U. S. Patent No. 1,401,702, granted December 27th, 1921, this resilient tool carrier comprises superimposed sections 24 connected by a central bolt 25. The upper section is provided with depending lugs 26 which enter arcuate recesses 27 formed in the lower section. Coil springs 28 are disposed in these recesses and bear at the one end against the lugs 26 and at the other end against plates 29 adjustable by means of set screws 30. The upper section 24 which carries the cutting tool may be rotated relatively to the lower section against the tension of the springs 28, these springs however, acting to rotate the upper section until the lugs 26 depending therefrom abut the ends of the arcuate recesses. The tension of the springs 28 may be regulated by adjusting the set screws 30. In this manner, a constant pressure is put on the cutting tool so as to keep the same in engagement with the work the upper section being rotated so as to dispose the cutting tool at an angle prior to the time that the cutting tool is inserted in a central bore formed in the work piece and as the work is cut the upper section 24 of the cutting tool holder gradually assumes the position where the lugs 26 abut the end of the arcuate slots.

For shifting the cross slide and consequently the cutting tool, the amount of the clearance of the guiding member 17 in the groove in the guiding templet, there is provided two pair of cooperating cams, one of each pair being carried by the lower section of the cutting tool carrier 21. These cams are numbered 31 and are pivotally mounted to the lower section of the tool carrier 21 by means of pivot pins 32. Each cam carries a pin 33 working in a slot 34 formed in the tool carrier. This pin and slot arrangement limits the movement of each cam 31.

Secured to the bed 10 of the lathe is a frame 35 provided with a pair of supports 36 which adjustably support a pair of arms 37, the supports 36 being caused to grip the arms 37 by means of clamping screws 38 or the like. Supported by the forward end of each arm 37 is a sleeve 39 which houses a movable plunger or body 40 having a reduced end 41 which carries a coil spring 42. Lock nuts 43 provide a stop for the plunger 40 in one direction and also permit an adjustment of the tension of the spring 42.

The other end of the plunger 40 is bifurcated and supports at 44 a cam 45. Each cam 45 is cut away arcuately as at 46 thereby providing a pair of stop shoulders 47 which engage a pin 48 carried by the bifurcated ends of the plunger. The cam 45 is provided with an abrupt flat face 49 and a curved face 50 while each cam 31 is provided with an abrupt flat face 51 and a curved face 52.

The operation of the device may be described as follows:

Assuming that the tool carrier 21 is travelling in the direction of the arrow A (see Figs. 1 and 3), the purpose of the cams would be to shift the cross slide and all the parts carried thereby in the direction of arrow B (see Fig. 1), so that the edge of the guiding member 17 will bear against the guide face formed by the multi-ply sector 20ª. This is accomplished by the pair of cams furthest away from the guiding member. As the carrier 21 advances the curved face 52 of cam 31 engages curved face 50 of cam 45 and rides upwardly on this cam. This engagement of the cams shifts the cross slide and all the parts carried thereby in the direction of the arrow B and causes the guiding member 17 to ride on the guiding face formed by the multi-ply sector 20ª. The tendency of the cams to displace the cross slide further than necessary is compensated for by the coil spring 42 which is compressed by a longitudinal displacement of the plunger 40. It will be seen that these two cams must engage with their curved faces because the pin 33 is at the end of the arcuate slot 44 formed in the carrier 21. Also that the shoulder 47 on the cam 45 is in engagement with the pin 48. On the other hand the flat face 51 of the cam 31 of the other pair has engaged the flat face 49 of cam 45 and thereby rotating both cams to an idle position where they may clear one another.

As the tool carrier 21 reverses and travels in the direction opposite to that indicated by the arrow A the cams will function in a reversed manner, the cams nearest the guiding member 17 will operate to shift the cross slide 14 in a direction opposite to that indicated by the arrow B thereby causing the guide member 17 to engage the guiding face formed by the multi-ply sector 20ᵇ. At the same time the other pair of cams have engaged with their flat surfaces, but have cleared one another, this being their idle movement.

Obviously, therefore, when the tool carrier moves toward the work in the direction of the arrow A the guiding member 17 will be caused to engage the guide face formed by the sector 20ª along which it may more easily pass because this face extends away from the guiding member 17 in its direction of travel. The clearance provided for the guiding member 17 at this section of the guide groove permits the guide member 17 to easily clear the sector 20ᵇ. Obviously on the reverse movement of the carrier 21 the guiding member 17 is moved away from the sector 20ª and against the sector 20ᵇ along which it may easily slide. This movement affects the cutting tool in that it moves the cutting edge 23 thereof away from the abrupt face on which it is cutting and causes the tool to make the cut along the section of the work piece marked C on its return movement rather than on its forward movement into the work piece.

From the foregoing it will be obvious that I have provided means for momentarily shifting the cutting tool guiding member whereby this guiding member as well as the cutting tool may be easily passed over the abrupt faces thereby insuring the proper action of the cutting tool even where acute cuts are to be made. This is of extreme importance in the particular art described, that is, bottle mould making and it will be immediately obvious that the invention lends itself to use in other similar types of lathes.

While one illustrative example of my invention is illustrated herein, I do not wish to be unnecessarily limited nor to be confined to the details of construction shown herein, but reserve the right to make such changes and modifications of this invention as may come within the purview of the accompanying claims.

Having thus described my invention, what I claim is:

1. In a device of the class described, a cutting tool, a travelling tool holder, a guiding member, a guide templet in which said guiding member travels and means arranged in the path of said tool holder and operatable by the movement of said tool holder for shifting said guiding member laterally in said guide templet.

2. In a device of the class described a travelling cutting tool holder, a guide member therefor, a templet in which said guiding member travels and cooperating cams arranged respectively on said tool holder and in the path of said tool holder and engaging during the movement of said travelling tool holder for shifting said guiding member in said templet.

3. In a device of the class described a travelling tool holder, a guiding member secured thereto, a templet through which said guiding member travels for shifting said tool holder, a pair of cams mounted adjacent said tool holder, cooperating cams carried by said tool holder and engageable with said first mentioned cams during the travel of said tool holder whereby said guiding member will be shifted transversely of said templet during the travel of said tool holder.

4. In a device of the class described a travelling tool holder, a guide member secured thereto, a templet cooperating with said guide member for shifting said tool holder, a cam adjustably positioned at each side of said tool holder, cooperating cams carried by said tool holder, a pair of said cams being brought into engagement during the movement of said tool holder in both directions whereby said guiding member will be shifted against opposite faces of said templet.

5. In a device of the class described a travelling tool holder, a guiding member secured thereto, a templet cooperating with said guide member for laterally displacing the tool holder to fashion the work, said guide member having a clearance in said templet at one portion thereof, cams supported adjacent both sides of said travelling tool holder, resilient means urging said cams toward said tool holder, cooperating cams carried by said tool holder, a pair of said cams being brought into engagement during the movement of said tool holder in either direction, whereby said guide member will be moved transversely of said templet into engagement with one or the other of the guide faces.

MONROE G. HUSTED.